(12) United States Patent
Inoue et al.

(10) Patent No.: US 6,773,775 B2
(45) Date of Patent: Aug. 10, 2004

(54) MEDICAL MULTILAYER SEALANT FILMS AND METHODS FOR PRODUCING THE SAME

(75) Inventors: Fujio Inoue, Naruto (JP); Masamitsu Izumi, Naruto (JP); Shigetoshi Kashiyama, Naruto (JP)

(73) Assignee: Otsuka Pharmaceutical Factory, Inc., Naruto (JP)

( * ) Notice: Subject to any disclaimer, the term of this patent is extended or adjusted under 35 U.S.C. 154(b) by 0 days.

(21) Appl. No.: 10/330,050

(22) Filed: Dec. 30, 2002

(65) Prior Publication Data

US 2003/0124329 A1 Jul. 3, 2003

Related U.S. Application Data

(63) Continuation of application No. 08/796,755, filed on Feb. 6, 1997, now abandoned, which is a continuation-in-part of application No. 08/545,606, filed as application No. PCT/JP95/00410 on Mar. 10, 1995, now abandoned.

(30) Foreign Application Priority Data

Mar. 15, 1994 (JP) .............................................. 6-43511

(51) Int. Cl.[7] .......................... B32B 27/32; B32B 27/28
(52) U.S. Cl. ...................... 428/35.4; 428/516; 428/520; 428/522; 264/173.14
(58) Field of Search ............................... 428/516, 520, 428/522, 35.4; 264/173.14

(56) References Cited

U.S. PATENT DOCUMENTS

| 4,355,721 A | 10/1982 | Knott, II et al. ......... 206/524.2 |
| 4,407,873 A | 10/1983 | Christensen et al. .......... 428/35 |
| 4,557,780 A | 12/1985 | Newsome et al. |
| 4,950,510 A | 8/1990 | Massouda ................... 428/34.2 |
| 5,004,647 A | 4/1991 | Shah |
| 5,153,074 A | 10/1992 | Migliorini .................... 428/463 |
| 5,270,102 A | 12/1993 | Allingham |
| 5,374,459 A | 12/1994 | Mumpower et al. |

FOREIGN PATENT DOCUMENTS

| EP | 0093797 A1 | 11/1983 |
| EP | 0236099 A2 | 9/1987 |
| JP | 02-258339 | 10/1990 |
| JP | 04-147853 | 5/1992 |
| WO | WO93/22131 | 11/1993 |
| WO | WO95/25010 | 9/1995 |

OTHER PUBLICATIONS

Botros, "Fundamentals of the Adhesion Mechanism at the PLEXAR® Tie–Layer Resin / EVOH Interface", Nov. 1994.*

Encyclopedia of Polymer Science and Engineering, Supplement Volume (1989); John Wiley & Sons, New York; pp. 611–612.

Encyclopedia of Polymer Science and Engineering, vol. 17 (1980); John Wiley & Sons, New York; p. 511.

* cited by examiner

Primary Examiner—D. Lawrence Tarazano
(74) Attorney, Agent, or Firm—Armstrong, Kratz, Quintos, Hanson & Brooks LLP (57) ABSTRACT

A multilayer sealant film for use in the medical field at least comprises as its innermost layer a first layer comprising at least one resin selected from the group consisting of linear low-density polyethylene, low-density polyethylene, polypropylene and polybutene-1, and a third layer comprising an ethylene-vinyl alcohol copolymer and laminated to the outer side of the first layer with a second layer serving as an adhesive layer and comprising a resin containing, as a main component, at least one of an amorphous polyolefin, adherent polyolefin and ethylene-vinyl acetate copolymer. The ethylene-vinyl alcohol copolymer forming the third layer functions as a barrier for preventing contaminants from migrating from outside of the third layer toward the first layer (innermost layer). Further, it is possible to improve the formability of the multilayer film since the difference in density between the resin for forming the first layer and the resin for forming the second layer is set to be 0.02 g/cm³ or less.

23 Claims, 5 Drawing Sheets

MEDICAL MULTILAYER SEALANT FILMS AND METHODS FOR PRODUCING THE SAME

This application is a continuation of application Ser. No. 08/796,755, filed Feb. 6, 1997 abandoned, which is a continuation-in-part of application Ser. No. 08/545,606 filed Nov. 6, 1995, now abandoned which is a national phase application under §371 of international application PCT/JP95/00410 filed Mar. 10, 1995 and claiming priority based on Japanese Patent Application No. 1994-43511 filed Mar. 15, 1994.

TECHNICAL FIELD

The present invention relates to medical multilayer sealant films, and more particularly to a medical multilayer sealant film which is useful as a material for forming the innermost layer of films for medical containers, medical container packaging films and medical container covering films and methods for preparing the same.

BACKGROUND ART

From the viewpoint of preventing deterioration of medicinals or breakage of containers and ensuring see-through properties, single-layer films or multi-layered films which are excellent in gas barrier properties, moisture impermeability, heat resistance, impact resistance and transparency have heretofore been used generally as plastic film materials, for example, for making medical containers, packaging medical containers or covering medical containers. These film materials include as a component a base film. Examples of resin material for the base film is, for example, nylon, polyethylene terephthalate, polyvinyl alcohol or the like.

Further in order to give improved heat-sealing properties, it has been practice to laminate a sealant film to the base film of the film material with a silicone, epoxy, urethane, urethane-epoxy, acryl or like adhesive. Chiefly used as the sealant film in this case is a film of resin having a low melting point and low density, such as low-density polyethylene. Such a resin film affords a high heat-sealing strength, permits sealing at a low temperature, gives a specified heat-sealing strength despite adhesion of dust or the like, and is therefore excellent in quality and properties as a sealant film.

With the film material comprising the base film, adhesive layer and sealant film, the base film and the adhesive often contain contaminants.

These contaminants and causes for contamination are as follows.

(1) Various additives added to the material to be formed into the base film for giving improved properties to the film. Such additives are phthalic acid esters [(such as dioctyl phthalate (DOP), di-n-butyl phthalate (DNBP), diethyl phthalate (DEP), diethylhexyl phthalate (DEHP)], chlorinated paraffin, adipic acid esters, fatty acid amide, phosphorus derivatives antioxidants, phenol derivatives antioxidants, etc.

(2) It is likely that the extruder die will be coated with a rust inhibitor or release agent (such as silicone oil). The rust inhibitor or release agent adheres to and contaminates the base film when it is formed.

(3) Contamination due to adhesion of the contaminant or contaminant-containing water to the outer surface of the base film.

(4) In the case where the base film contains nylon resin, adipic acid or caprolactam as a component of the nylon resin.

(5) A reaction product present in the adhesive.

The sealant film providing the innermost layer of the film material conventionally available has no barrier properties to these contaminants, so that if the base film and/or the adhesive contains the contaminant, the contaminant migrates to the inside of the innermost layer through the adhesive layer and the sealant film.

Accordingly, the products prepared from the film material, such as medical containers, medical container packaging bags or medical container covers, are unable to protect the contents, such as medicinals, from contamination with contaminants.

Further if the medicinal is contaminated with contaminants, decomposition of the medicinal, a change in its appearance, deterioration or like problem is likely to arise.

DISCLOSURE OF THE INVENTION

An object of the present invention is to provide a formability-improved medical multilayer sealant film having excellent heat-sealing properties and barrier properties to the foregoing contaminants.

Another object of the invention is to provide contamination preventing film for medical containers, medical container packaging film and medical container covering film which include the sealant film as the innermost layer.

Still another object of the invention is to provide contamination preventing products, such as a medical container, a medical container packaging bag (hereinafter referred to as a "packaging bag") and a medical container cover (hereinafter referred to as a "cover"), which include the sealant film as the innermost layer.

Still another object of the invention is to provide a highly productive method of producing the above multilayer sealant film of high quality.

Other features of the present invention will be clarified by the following description.

The present invention provides a medical multilayer sealant film which is a multilayer sealant film having as the innermost layer a first layer comprising at least one resin selected from the group consisting of linear low-density polyethylene, low-density polyethylene, polypropylene and polybutene-1, the sealant film being characterized in that a third layer comprising an ethylene-vinyl alcohol copolymer is laminated to the outer side of the first layer with a second layer serving as an adhesive layer and comprising a resin containing, as a main component, at least one of an amorphous polyolefin, adherent polyolefin and ethylene-vinyl acetate copolymer, and in that the difference in density between the resin constituting the first layer and the resin constituting the second layer is 0.02 g/cm$^3$ or less.

Still further, the present invention provides a method of producing a medical multilayer, wherein a co-extrusion inflation process is used to produce the above constructed multilayer sealant film, and wherein the lay flat width of the film is set to be 420 mm–1100 mm and the film take-off speed is set to be 7.0–15.0 m/min when forming the film.

The sealant film of the present invention may comprise, in addition to the three-layer structure of the first to third layers, a fourth layer and a fifth layer successively formed over the outer side of the third layer constituting the outermost layer of the structure.

In this case, the resin mentioned for the second layer is used for forming the fourth layer, and the resin mentioned for the first layer is used for forming the fifth layer, and the difference in density between both resins needs to be 0.02 g/cm³ or less.

The sealant film of the present invention is usable for forming the innermost layer of films for medical containers, medical container packaging films and medical container covering films.

The term "films for medical containers" as used herein refers to films for use in forming medical containers.

The term "medical container packaging films" refers to films for forming packaging bags which wraps and seals off a medical container entirely (hereinafter referred to as "packaging films").

The term "medical container covering films" refers to films for forming a cover which wraps in at least one compartment of a medical container locally adheres to the container (hereinafter referred to as "covering films").

BEST MODE OF CARRYING OUT THE INVENTION

Embodiments of the present invention will be described below with reference to the accompanying drawings.

Figure 1:
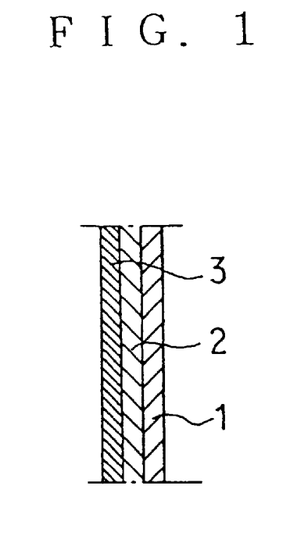
FIG. 1 is a sectional view showing a medical multilayer sealant film of the three-layer type according to the invention.

FIG. 1 shows an example of medical multilayer sealant film having a three-layer structure and embodying the present invention.

A first layer 1 providing the innermost layer has desirable heat-sealing properties and is made from at least one resin selected from the group consisting of linear low-density polyethylene, low-density polyethylene, polypropylene and polybutene-1. Among these, linear low-density polyethylene or low-density polyethylene is preferable.

The first layer 1 may comprise a mixture of at least two resins which are different in miscibility.

To be suitable, the preferred density of the resin to be used for forming the first layer 1 is 0.895–0.945 g/cm³, for example.

The thickness of the first layer 1 is at least 10 μm, and is suitably determined preferably from the range of about 10 to about 40 μm.

To prevent contaminants from migrating from outside toward the innermost layer (first layer), a third layer 3 having barrier properties to contaminants is formed over the outer side of the first layer 1 with a second layer 2 interposed therebetween.

The third layer 3 is made from an ethylene-vinyl alcohol copolymer (also termed saponified ethylene-vinyl acetate copolymer) having barrier properties to contaminants. It is suitable that the thickness of this layer be at least 10 μm, preferably about 10 to about 25 μm. The ethylene copolymerization mole ratio of the resin can be selected from a wide range, and is preferably 29 to 44% in view of flexibility, barrier properties to contaminants, etc.

Although the ethylene-vinyl alcohol copolymer for forming the third layer 3 can be made into a two-layer film along with the first layer 1 by co-extrusion, this method is not desirable since the resulting film is much inferior to usual co-extruded films in interlaminar strength. According to the invention, therefore, the second layer 2 which is highly adherent to the third layer 3 and the first layer 1 (innermost layer) is provided between the two layers.

The second layer 2 comprises a resin containing, as a main component, at least one of an amorphous polyolefin, adherent polyolefin, and ethylene-vinyl acetate copolymer which is improved in adhesion when required, and is preferably 5 to 25 μm, more preferably 5 to 15 μm, in thickness.

The amorphous polyolefin to be used for forming the second layer 2 is, for example, an ethylene-α-olefin copolymer (hereinafter referred to as an "amorphous polyethylene") having a density of 0.880 to 0.890 g/cm³, propylene-α-olefin copolymer (hereinafter referred to as an "amorphous polypropylene") having a density of 0.880 to 0.890 g/cm³, or the like. Among these, the amorphous polyethylene is desirable. Examples of the α-olefins are, for example propylene, 1-butene, 1-pentene, 1-hexene, 4-methyl-1-pentene, 1-heptene, 1-octene, 1-nonene, 1-decene, 1-undecene, 1-dodecene and the like which have 3 to 12 carbon atoms. Among these, 1-butene is desirable for forming the copolymer. However, propylene is excluded in the case of propylene-α-olefin copolymer.

The adherent polyolefin is prepared by graft-polymerizing maleic acid with polyethylene, polypropylene or like polyolefin and improved in adhesion. Examples of such polyolefins are adherent polyethylene, adherent polypropylene, etc., among which adherent polyethylene is preferred.

The ethylene-vinyl acetate copolymer exhibits good adhesion or poor adhesion depending on the ethylene copolymerization mole ratio of the resin. The copolymer is used as it is in the former case, whereas in the latter case, maleic acid is graft-polymerized with the copolymer to impart improved adhesion.

The densities of the adherent polyolefin and the adhesion-improved ethylene-vinyl acetate copolymer are approximately 0.890–0.945 g/cm³.

If there is too great a difference in density between the resin used for forming the first layer and the resin used for forming the second layer, the formability decreases. Accordingly, the density difference therebetween needs to be 0.02 g/cm³ or less. For the purpose of adjusting the resin densities, the resin used for forming the first layer or high density polyethylene may be added to the resin used for forming the second layer.

The first layer 1 and the second layer 2 are formed inwardly of the third layer 3 having barrier properties to contaminants and are therefore undesirable if containing contaminants. Accordingly, the foregoing resins for forming the first layer 1 and the second layer 2 are used without adding thereto additives which will become contaminants.

The third layer 3 is formed also without using any additive, so that no additive migrates from the third layer 3 inward.

It is required that the medical multilayer sealant film of the present invention at least have a three-layer structure comprising the first layer 1 (innermost layer), second layer 2 and third layer 3 as shown in FIG. 1. Another layer can be laminated to the outer side of the third layer 3 when so required.

A suitable known plastic resin layer can be selected for use as the other layer in this case. Presence of a contaminant in this layer poses no particular problem.

Figure 2:
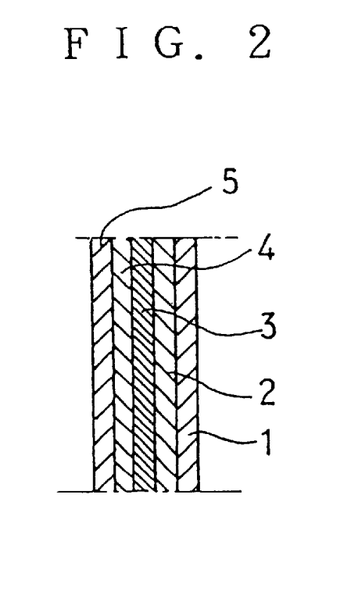
FIG. 2 is a sectional view showing a medical multilayer sealant film of the five-layer type according to the invention.

To retain transparency and flexibility of the sealant film of the invention, it is desired to laminate as the other layer a fifth layer 5 which comprises at least one resin selected from the group consisting of linear low-density polyethylene, low-density polyethylene, polypropylene and polybutene-1 using a fourth layer 4 serving as an adhesive layer and comprising an amorphous polyolefin, adherent polyolefin, or ethylene-vinyl acetate copolymer which is improved in adhesion when required, as seen in FIG. 2. In this case, the difference in density between the resins for the forth and fifth layers is set to be 0.02 g/cm$^3$ or less from the view point of formability. The thickness of the fourth layer 4 is suitably selected from the range preferably of 5 to 25 μm, more preferably of 5 to 15 μm. The thickness of the fifth layer 5 is suitably selected from the range preferably of 10 to 40 μm, more preferably of 10 to 20 μm.

The overall thickness of the medical multilayer sealant film of the type shown in FIG. 1, as well as of the type shown in FIG. 2, is suitably selected from the range of 50 to 80 μm.

In order to realize high productivity, the multilayer sealant film of the present invention is formed by using a water-cooled or air-cooled co-extrusion inflation process.

According to the present invention, since the difference in density between the resins for forming the first and second layers is small, i.e., 0.02 g/cm$^3$ or less, whereby the formability of the multilayer film is improved. Accordingly, it is possible to increase the lay flat width of the film, during formation, up to 420–1100 mm, and also it is possible to maintain the film take-off speed at a relatively high, i.e., 7.0–15.0 m/min during formation of the film, thereby producing the above-mentioned multilayer sealant film with high productivity. Further, because of the improved formability, the resultant product has no wrinkle and therefore has high quality.

A film for medical containers, packaging film or covering film is obtained by laminating a base film to the outer layer of the present sealant film.

The sealant film of the invention can be laminated to the base film by dry lamination or wet lamination. Further in the case where the outermost layer of the present sealant film has heat-sealing properties, and the innermost layer of the base film has heat-sealing properties, heat-sealing means may be used for adhering the films.

When the above-mentioned films are formed into suitable shapes in the usual manner, various products are available which include medical containers, packaging bags and covers like the examples shown in FIGS. 3 to 6.

Figure 3:
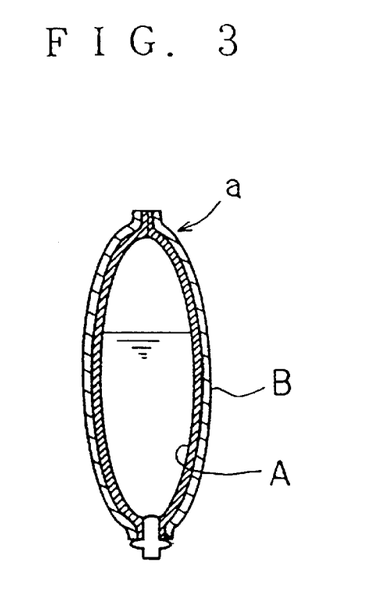
FIG. 3 is a view in vertical section showing an example of medical container formed from a film including a sealant film of the invention.

FIG. 3 shows a medical container film prepared by laminating a sealant film A of the invention to a base film B, and a medical container a formed from the film. Various known films for use in making medical containers are usable as the base film B.

Figure 4:
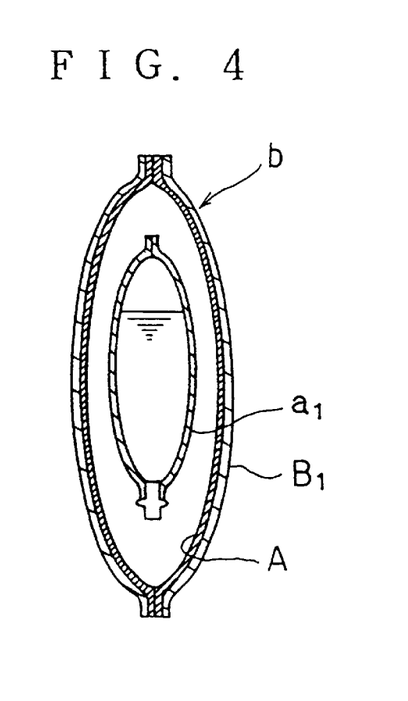
FIG. 4 is a view in vertical section showing an example of packaging bag prepared from a like film.
Figure 5:
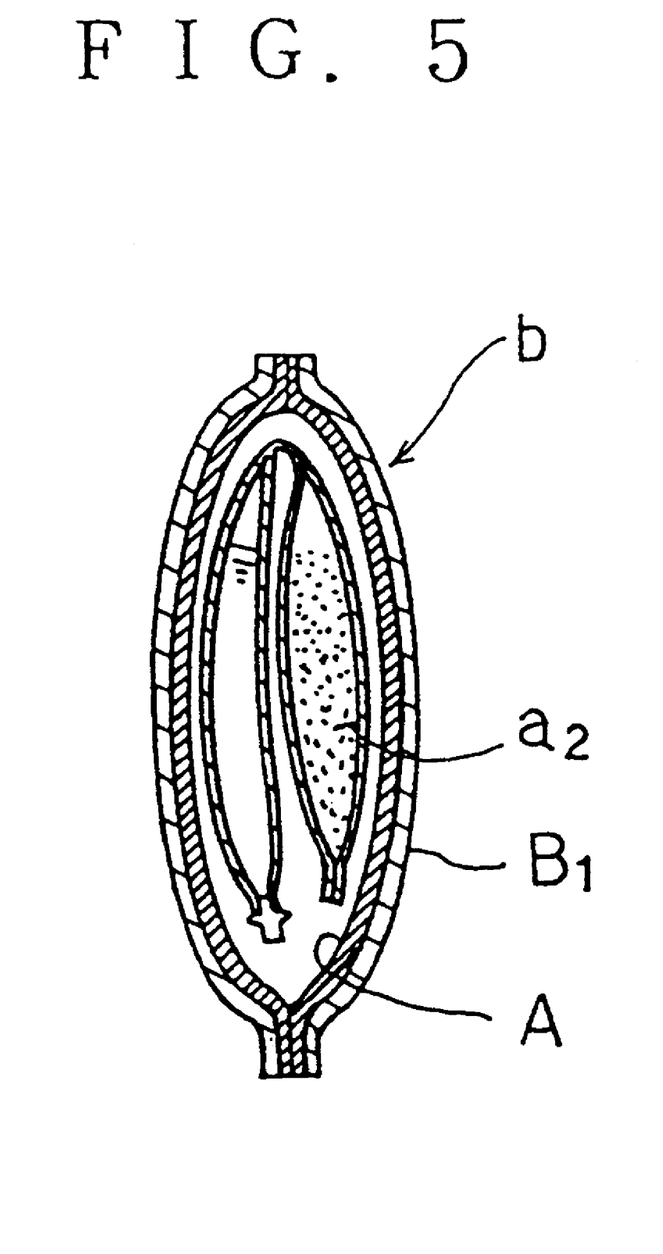
FIG. 5 is a view in vertical section showing another example prepared from the same film.

FIGS. 4 and 5 show a packaging film with the invention sealant film A laminated to the base film $B_1$ and packaging bags b formed from the film. Medical containers $a_1$, $a_2$ are enclosed in the respective bags b. FIG. 5 shows a double-chamber container $a_2$ as enclosed in a folded state.

In the case where the medicinals within the medical containers $a_1$ and $a_2$ are very susceptible to degradation due to oxygen and moisture, the base film $B_1$ to be used for forming the packaging bags b needs to be film having gas barrier properties and moisture impermeability to preclude the degradation of the medicinals in the containers $a_1$ and $a_2$.

Usable as the base film $B_1$ having high gas barrier properties and moisture impermeability is a composite film comprising a polyolefin film and aluminum foil laminated thereto and impervious to oxygen and water vapor, a single or multi-layered resin film material comprising polyethylene terephthalate (PET), polyvinylidene chloride, polyvinyl alcohol, polyamide, ethylene-vinyl acetate copolymer as saponified or the like, or a laminated film material of the resin film and the above composite film.

Other materials favorably usable include a composite film which comprises a polyvinyl alcohol film, polyethylene terephthalate film or saponified ethylene-vinyl acetate copolymer film, and a silicon oxide layer formed on the film by vacuum deposition.

Given below are examples of multilayer films comprising such a composite film.

(I) A multilayer film comprising a composite film prepared by forming a silicon oxide layer on a polyvinyl alcohol film by vacuum deposition, and a PET film (outermost layer) formed on the silicon oxide layer of the composite film by dry lamination.

(II) A multilayer film which comprises a composite film prepared by forming a silicon oxide layer on a polyvinyl alcohol film by vacuum deposition, and the multilayer film (I) and which is prepared by dry lamination with the polyvinyl alcohol film of the film (I) superposed on the silicon oxide layer of the composite film.

The packaging bag b is used also for protecting the medical container $a_1$ or $a_2$ from an external impact. Used as the base film $B_1$ in this case is a single-layer or multilayer film material which includes as a component a film of PET, nylon, polyethylene, polypropylene or the like having a high impact strength.

Figure 6:
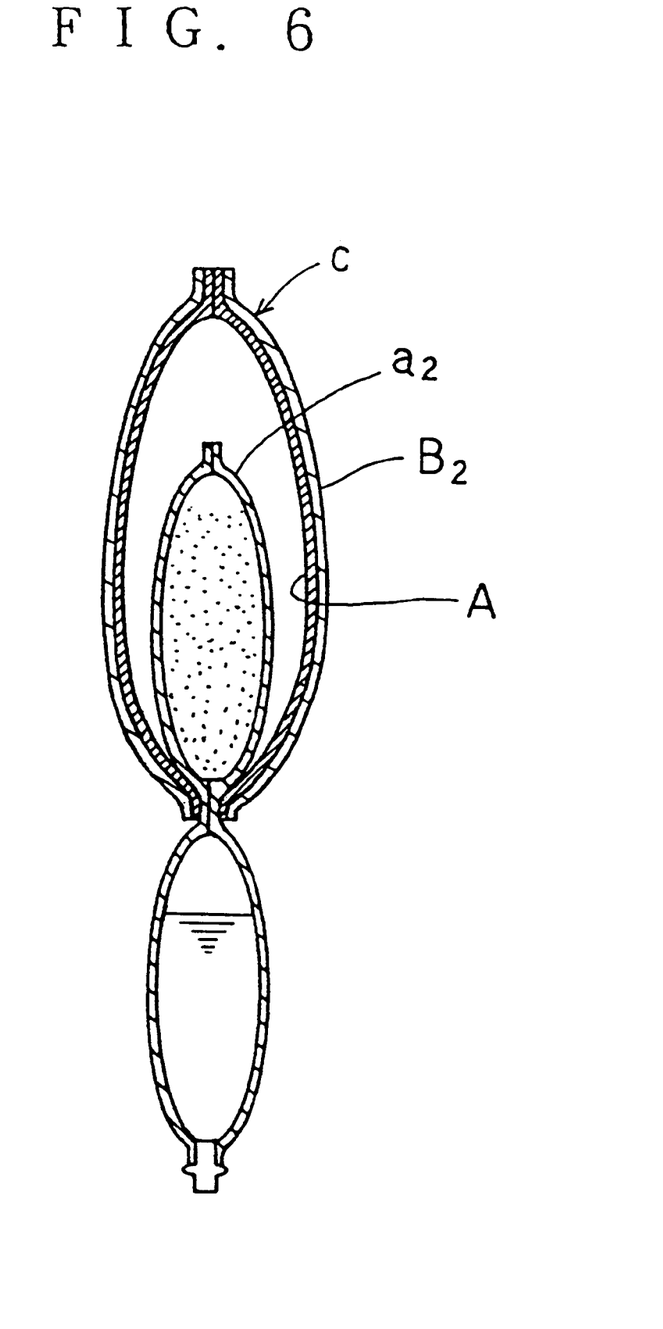
FIG. 6 is a view in vertical section showing an example of cover prepared from a like film.

FIG. 6 shows a covering film which comprises the sealant film A of the invention and a base film $B_2$ laminated thereto, and a cover c formed from the covering film and enclosing one chamber of the double-chamber container $a_2$ therewith.

The cover c is used for the same purpose as the packaging bag b, so that like the base films $B_1$, $B_2$ to be used is a film material having high gas barrier properties and moisture impermeability.

Figure 7:
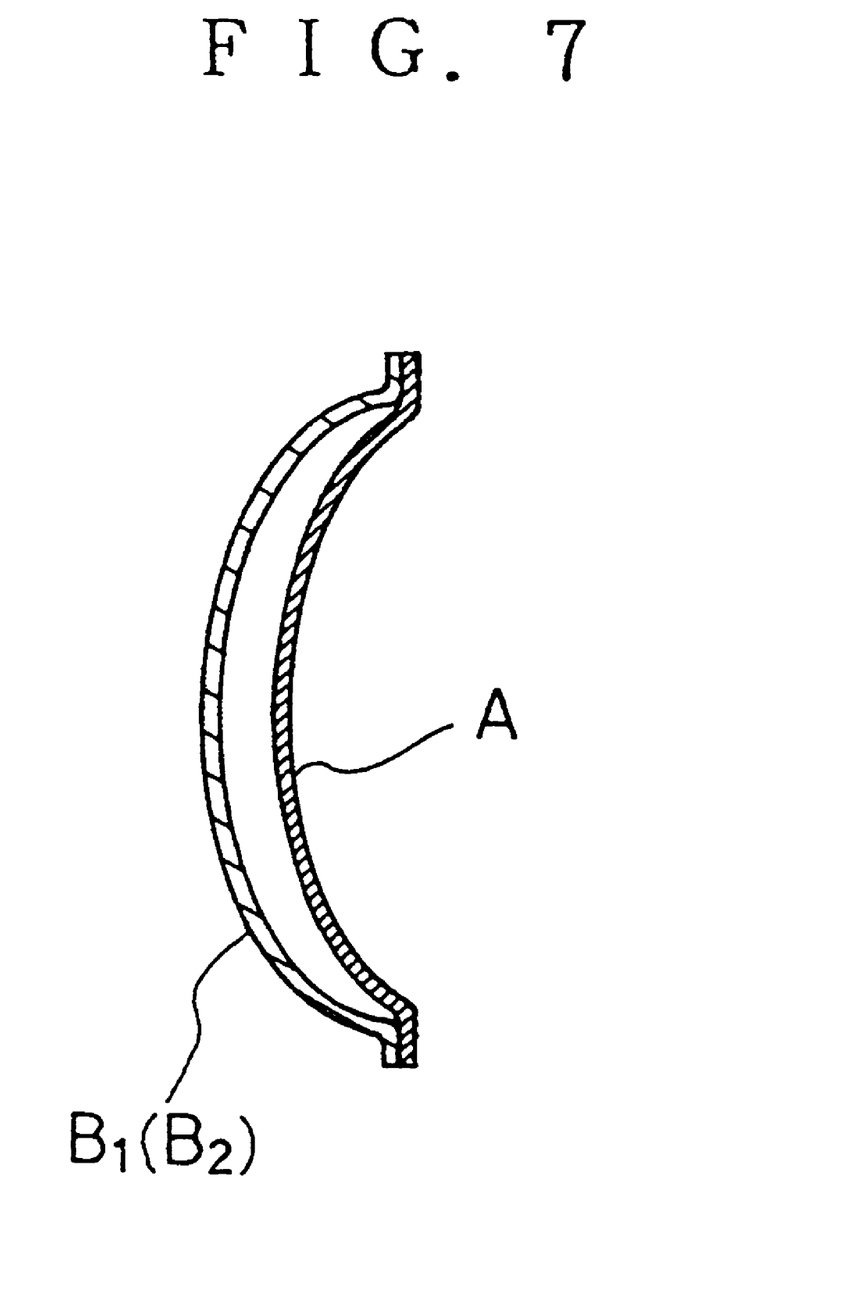
FIG. 7 is a view in vertical section showing the sealant film of the invention as locally adhered to the base film of a packaging film or covering film.

For use in the packaging film or the covering film, the sealant film A is adhered to the base film $B_1$ or $B_2$ over the entire surface thereof as seen in FIGS. 4 to 6, or locally thereto so as to provide a space between the base film $B_1$ or $B_2$ and the film A as shown in FIG. 7.

Although the sealant film, medical containers, packaging bags and cover embodying the invention are herein described with reference to FIGS. 1 to 7, the mode of practicing the invention as these embodiments, the shape or size thereof, etc. are in no way limited but the invention can of course be embodied variously without departing from the principle feature of the invention.

The present invention provides products made from a film material comprising the sealant film of the invention and a base film laminated to the outer layer thereof, i.e., medical containers, packaging bags and covers, such as those shown in FIGS. 3 to 6. The sealant film has barrier properties to contaminants and therefore eliminates the likelihood that the contaminants present in the base film and/or those from outside will penetrate into the medical container to prevent the contaminants from contaminating the medicinal.

The medical containers shown in FIGS. 3 to 6 are used for containing common medicinals, which may be powder preparations, liquid preparations or solid preparations.

Examples of powder preparations include antibiotics, anticancer agents, proteins, peptides, steroids, fibrinolytic agents and vitamins. Examples of antibiotics are cephazolin, β-lactam type such as ampicillin, carbapenem type such as imipenem, aminoglycoside type such as kanamycin, polypeptide type such as vancomycin and macrolide type such as erythromycin. Examples of liquid preparations are physiological saline, glucose solution, distilled water for injection, electrolytic solutions, amino acid solutions, fat emulsions, etc.

Incidentally, the powder preparations such as antibiotics among the above-mentioned medicinals are necessary to be dissolved in the physiological saline or the glucose solution for injection into a patient when being used. Therefore, there has been recently developed a multi-compartment container having two compartments as shown in FIG. 6 in order to render their operations simple.

FIG. 6 shows multi-compartment container. The upper compartment thereof accommodates an antibiotic easy to be adversely affected by even a little amount of contaminants, and the lower compartment accommodates a solvent such as physiological saline or glucose solution. Only the upper compartment is double-covered with the cover.

Embodiments of the invention and comparative examples will be described below, followed by a test example wherein they were used.

[Embodiment 1] (FIG. 1 Type)

Using a water-cooled co-extrusion inflation machine, a sealant film was prepared which had a three-layer structure comprising an outermost layer, i.e., a 15-μm-thick third layer of ethylene-vinyl alcohol copolymer (manufactured by Nihon Goseikagaku Co., Ltd., brand name: SOANOL, 44% in ethylene copolymerization mole ratio, hereinafter referred to as "EVOH (1)"), an intermediate layer, i.e., a 10-μm-thick second layer of adherent polyethylene (manufactured by Mitsui Petrochemical Industries, Ltd., brand name: ADMER, 0.940 g/cm$^3$ in density, hereinafter referred to as "PE (1)"), and an innermost layer, i.e., a 40-μm-thick first layer of linear low-density polyethylene (manufactured by Mitsui Petrochemical Industries, Ltd., brand name: ultzex, 0.940 g/cm$^3$ in density, hereinafter referred to as "L-LDPE (1)"). In the same manner as in Embodiment 1, the sealant films of Embodiments 2 to 8 and Comparative Example 1 were formed.

[Embodiment 2] (FIG. 1 Type)

Third layer (outermost layer): EVOH (1), 15 μm in thickness

Second layer (intermediate layer): PE (1), 0.940 g/cm$^3$ in density and 10 μm in thickness First layer (innermost layer): linear low-density polyethylene (manufactured by Mitsui Petrochemical Industries, Ltd., brand name: ultzex), 0.930 g/cm$^3$ in density and 40 μm in thickness

[Embodiment 3] (FIG. 1 Type)

Third layer (outermost layer): EVOH (1), 15 μm in thickness

Second layer (intermediate layer): PE (1), 0.940 g/cm$^3$ and 10 μm in thickness First layer (innermost layer): linear low-density polyethylene (manufactured by Mitsui Petrochemical Industries, Ltd., brand name: ultzex), 0.920 g/cm$^3$ in density and 40 μm in thickness

[Embodiment 4] (FIG. 1 Type)

Third layer (outermost layer): EVOH (1), 15 μm in thickness

Second layer (intermediate layer): adherent polypropylene (manufactured by Mitsui Petrochemical Industries, Ltd., brand name: ADMER), 0.910 g/cm$^3$ and 10 μm in thickness First layer (innermost layer): polypropylene (manufactured by Mitsui Petrochemical Industries, Ltd. and sold by Grand Polymer, Ltd., brand name: HIPOL), 0.910 g/cm$^3$ in density and 40 μm in thickness

[Embodiment 5] (FIG. 1 Type)

Third layer (outermost layer): EVOH (manufactured by Nihon Goseikagaku Co., Ltd., brand name: SOANOL, 38% in ethylene copolymerization mole ratio, hereinafter referred to as "EVOH (2)"), 15 μm in thickness Second layer (intermediate layer): adherent polyethylene (manufactured by Mitsui Petrochemical Industries, Ltd., brand name: ADMER, 0.930 g/cm$^3$ in density)+amorphous polyethylene (manufactured by Mitsui Petrochemical Industries, Ltd., brand name: TAFMER A, 0.880 g/cm$^3$ in density), 0.9125 g/cm$^3$ in density and 10 μm in thickness First layer (innermost layer): linear low-density polyethylene (manufactured by Mitsui Petrochemical Industries, Ltd., brand name: ultzex, 0.940 g/cm$^3$ in density)+polypropylene (manufactured by Mitsui Petrochemical Industries, Ltd. and sold by Grand Polymer, Ltd., brand name: HIPOL, 0.910 g/cm$^3$ in density), 0.925 g/cm$^3$ in density and 40 μm in thickness

[Embodiment 6] (FIG. 1 Type)

Third layer (outermost layer): EVOH (manufactured by Kuraray Co., Ltd., brand name: EVAL type-F, 32% in ethylene copolymerization mole ratio, hereinafter referred to as "EVOH (3)"), 15 μm in thickness Second layer (intermediate layer): adherent ethylene-vinyl acetate copolymer (manufactured by Mitsui Petrochemical Industries, Ltd., brand name: ADMER), 0.908 g/cm$^3$ in density and 10 μm in thickness First layer (innermost layer): low-density polyethylene (manufactured by Mitsui Petrochemical Industries, Ltd., brand name: MIRASON), 0.908 g/cm$^3$ in density and 40 μm in thickness

[Embodiment 7] (FIG. 1 Type)

Third layer (outermost layer): EVOH (3), 10 μm in thickness

Second layer (intermediate layer): adherent polypropylene (manufactured by Mitsui Petrochemical Industries, Ltd., brand name: ADMER, 0.910 g/cm$^3$ in density)+amorphous polyolefin (manufactured by Mitsui Petrochemical Industries, Ltd., brand name: TAFMER, 0.890 g/cm$^3$ in density), 0.909 g/cm$^3$ in density and 10 μm in thickness First layer (innermost layer): polypropylene (manufactured by Mitsui Petrochemical Industries, Ltd. and sold by Grand Polymer, Ltd., brand name: HIPOL), 0.910 g/cm$^3$ in density and 40 μm in thickness

[Embodiment 8]

Third layer (outermost layer): EVOH (manufactured by Kuraray Co., Ltd., brand name: EVAL, 44% in ethylene copolymerization mole ratio, hereinafter referred to as "EVOH (4)"), 10 μm in thickness Second layer (intermediate layer): the same as in Embodiment 7, 0.909 g/cm$^3$ in density and 20 μm in thickness First layer (innermost layer): the same as in Embodiment 7, 0.910 g/cm$^3$ in density and 40 μm in thickness

Comparative Example 1

Single Layer (Sealant Film): L-LDPE (1), 50 μm in Thickness

The films of Embodiments 1 to 8 were prepared by water-cooled co-extrusion inflation with a flat width of 420 mm (Ex. 1), 450 mm (Ex. 2), 500 mm (Ex. 3), 540 mm (Ex. 4), 680 mm (Ex. 5), 800 mm (Ex. 6), 1080 mm (Ex. 7) and 1100 mm (Ex. 8) and Comparative Example 1 were prepared by water-cooled co-extrusion inflation with a flat width of 540 mm. The film take-off speed for Embodiments 1, 2 and 7, and Comparative Example 1 was 7 to 10 m/min, and the film take-off speed for Embodiments 3 to 6 and 8 was 9 to 15 m/min.

Experimental Example

The base film X stated blow was united to the sealant films of Embodiments 1–8 over the outer layer thereof by dry lamination to obtain films as Embodiments 1X–8X.

The base film Y given below was united to the sealant films of Embodiment 1 and Comparative Example 1 over the outer layer thereof to obtain films as Embodiment 1Y and Comparative Example 1Y. (The dry lamination process was used for Embodiment 1, and heat-sealing means for Comparative Example 1.)

The base film Z given below was laminated to the sealant film of Comparative Example 1 by heatsealing means to obtain a film as Comparative Example 1Z.

X. L-LDPE (1), 300 μm in thickness
Y. Oriented nylon (ONy), 15 μm/urethane-epoxy resin (adhesive)/low-density polyethylene (LDPE), 40 μm in thickness
Z. Polyethylene terephthalate (PET), 12 μm/urethane-epoxy resin (adhesive)/(LDPE), 50 μm in thickness.

When the sealant film of the invention is laminated to the base films X and Y, the film surfaces to be united are treated by corona discharge first and then subjected to the usual dry lamination process.

The oriented nylon (ONy) film, polyethylene terephthalate (PET) film and low-density polyethylene (LDPE) film for constituting the base films, and the urethane-epoxy resin (adhesive) for use in dry lamination were all those generally available commercially.

The films of Embodiments 1X–8X, Embodiment 1Y, Comparative Example 1Y and Comparative Example 1Z were used for making medical containers wherein the sealant film served as the innermost layer, and the containers were tested by the following contamination experiments.

Contamination Experiment 1

DOP, di-n-butyl phthalate (DNBP) and diethyl phthalate (DEP) used as contaminants were applied by coating or spraying to the outer surface of the medical container (externally measuring 10 cm×10 cm) which was filled with 1 g (potency) of cephazolin sodium (CEZ), and thereafter preserved at 40° C. and 75% RH (relative humidity) for 3 months. The CEZ filled in was checked for the migration of the contaminants by GLC (Gas Liquid Chromatography) and the GC-MS (Gas Liquid chromatography-Mass Spectrography) method.

Contamination Experiment 2

After a die rust inhibitor (KG type, manufactured by Kobe Gosei Co., Ltd.) was sprayed onto the outer surface of the medical container as filled with 1 g (potency) of CEZ, it was preserved under the condition of 40° C. in temperature and 75% in RH for two weeks. Then, it was checked whether contaminants were migrated into the filled CEZ by GLC and the GC-MS method.

Contaminant Extraction Method and Extract Analysis Method

Special-grade n-hexane (manufactured by Wako Junyaku Co., Ltd.) was purified by distillation to remove the influence of DOP or DNBP present in the reagent. The CEZ contained was first fully dissolved in 10 to 20 ml of purified ultrapure water (manufactured by Millipore limited, brand name: MILLIQ), and the solution was placed into a separating funnel washed with a sufficient amount of purified ultrapure water. After purified ultrapure water was further added to the solution to a combined amount of 150 ml, 150 ml of the purified n-hexane was further added. The contaminants were allowed to fully migrate into the n-hexane fraction. The n-hexane fraction was concentrated to 10 ml, and a portion thereof was subjected to GLC analysis under the conditions given below.

The remaining n-hexane fraction was concentrated again to dryness, resulting solid was dissolved again in 0.2 ml of n-hexane as purified by distillation, and the solution was subjected to the GC-MS method to be described below.

Tables 1 and 2 show the results of these analyses.

The sealant film used for comparative examples, i.e., the single-layer film of L-LDPE (1), was checked for contamination by cutting out a piece approximately 1 cm square from the film, subjecting 2 g of the piece to extraction with 150 ml of n-hexane as purified by distillation, concentrating the extract to dryness and dissolving again the dry solid in the n-hexane purified by distillation and analyzing it by GLC and the GC-MS method, whereby the film was found totally free from any contaminants.

Devices Used

Products of Hewlett-Packard Co.
HP5890 Series II gas chromatograph
HP3396 Series II integrator
HP7673 Controller Analysis Conditions The conditions for gas chromatographic analysis were as follows.

Column: Ultra Alloy (HT) 30 m×0.25 mm ID×0.25 μm
Column temp.: 60° C.→10° C./min temp. rise→300° C.
Column flow rate: 1.30 ml/min
Carrier gas: He 4.0 kg/cm$^2$
Inlet temp.: 200° C.
Detector: FID
Detector temp.: 310° C.
Sensitivity: RANGE=0 ATT=0
Injection method: Splitless high-pressure injection
Inlet pressure: 30 psi (0 min)—99 psi/min—20 psi (constant flow)
Spit ratio: 38:1
Amount injected: 1 μl of solution Measuring Conditions GC-MS Device: HP-5890/5971A-GC-MS (manufactured by Hewlett-Packard Co., LTD.)
Column: J & W DB-1×30 m×0.25 mm×0.25 μm
Column temp.: 100° C.—10° C./min—280° C.
Inlet temp.: 280° C.
Detector temp.: 280° C.
Detector: MSD
Amount injected: 2 μl, splitless

TABLE 1

Result of Contamination Experiment 1

|  |  | DOP | DNBP | DEP | CAP | EPO |
|---|---|---|---|---|---|---|
| Embodiment 1X | GLC | — | — | — | — | — |
|  | GC-MS | — | — | — | — | — |
| Embodiment 2X | GLC | — | — | — | — | — |
|  | GC-MS | — | — | — | — | — |
| Embodiment 3X | GLC | — | — | — | — | — |
|  | GC-MS | — | — | — | — | — |
| Embodiment 4X | GLC | — | — | — | — | — |
|  | GC-MS | — | — | — | — | — |
| Embodiment 5X | GLC | — | — | — | — | — |
|  | GC-MS | — | — | — | — | — |
| Embodiment 6X | GLC | — | — | — | — | — |
|  | GC-MS | — | — | — | — | — |
| Embodiment 7X | GLC | — | — | — | — | — |
|  | GC-MS | — | — | — | — | — |
| Embodiment 8X | GLC | — | — | — | — | — |
|  | GC-MS | — | — | — | — | — |
| Embodiment 1Y | GLC | — | — | — | — | — |
|  | GC-MS | — | — | — | — | — |
| Comp. Ex. 1Y | GLC | ○ | ○ | ○ | ○ | ○ |
|  | GC-MS | ○ | ○ | ○ | ○ | ○ |
| Comp. Ex. 1Z | GLC | ○ | ○ | ○ | — | ○ |
|  | GC-MS | ○ | ○ | ○ | — | ○ |

TABLE 2

Result of Contamination Experiment 2

|  |  | RUST INHIBITOR | CAP | EPO |
|---|---|---|---|---|
| Embodiment 1X | GLC | — | — | — |
|  | GC-MS | — | — | — |
| Embodiment 2X | GLC | — | — | — |
|  | GC-MS | — | — | — |
| Embodiment 3X | GLC | — | — | — |
|  | GC-MS | — | — | — |
| Embodiment 4X | GLC | — | — | — |
|  | GC-MS | — | — | — |
| Embodiment 5X | GLC | — | — | — |
|  | GC-MS | — | — | — |
| Embodiment 6X | GLC | — | — | — |
|  | GC-MS | — | — | — |
| Embodiment 7X | GLC | — | — | — |
|  | GC-MS | — | — | — |
| Embodiment 8X | GLC | — | — | — |
|  | GC-MS | — | — | — |
| Embodiment 1Y | GLC | — | — | — |
|  | GC-MS | — | — | — |
| Comp. Ex. 1Y | GLC | ○ | ○ | ○ |
|  | GC-MS | ○ | ○ | ○ |
| Comp.Ex. 1Z | GLC | ○ | — | ○ |
|  | GC-MS | ○ | — | ○ |

CAP: Caprolactam,
EPO: epoxy compound
Rust inhibitor components: The peak obtained by analyzing the inhibitor alone is compared with the retention time of fragment data.
Meanings of the symbols in Tables 1 and 2:
—: The contaminants were not recognized.
○: The analysis gave a peak having the same retention time as an authentic substance corresponding to the contaminant, or data of the same fragment as the authentic substance corresponding to the contaminant.

The present invention provides medical multilayer sealant films retaining satisfactory heat-sealing properties. Use of films including the sealant film affords medical containers, packaging bags and covers which effectively prevent contamination.

Further, although the sealant film obtained according to the above forming method has an increased lay flat width of 420 mm, 450 mm, 500 mm, 540 mm, 680 mm, 800 mm, 1080 mm and 1100 mm and the film take-off speed is set to be relatively high, i.e., 7–15 m/min, there occurs no wrinkle in the obtained film at all, thereby obtaining improved film formability.

What is claimed is:

1. A medical multilayer sealant film which is a multilayer sealant film comprising a first layer comprising at least one resin selected from the group consisting of linear low-density polyethylene, low-density polyethylene, polypropylene and polybutene-1, a third layer comprising an ethylene-vinyl alcohol copolymer laminated to the outer side of the first layer, and a second layer serving as an adhesive layer between the first layer and the third layer and comprising a resin containing at least one of an amorphous polyolefin, adherent polyolefin and ethylene-vinyl acetate copolymer, wherein the difference in density between the first layer and the second layer is 0.02 g/cm$^3$ or less.

2. A sealant film as defined in claim 1 wherein the first layer comprises linear low density polyethylene or low-density polyethylene, and the second layer comprises an adherent polyethylene or ethylene-vinyl acetate copolymer.

3. A sealant film as defined in claim 1 wherein the first layer has a thickness of 10 to 40 μm, the second layer has a thickness of 5 to 24 μm, and the third layer has a thickness of 10 to 25 μm.

4. A sealant film as defined in claim 1 further including a fifth layer comprising at least one resin selected from the group consisting of linear low-density polyethylene, low-density polyethylene, polypropylene and polybutene-1 laminated to the outer side of the third layer, and a fourth layer between the third layer and the fifth layer serving as an adhesive layer and comprising a resin containing at least one of an amorphous polyolefin, adherent polyolefin and ethylene-vinyl acetate copolymer, wherein the difference in density between the fourth layer and the fifth layer is 0.02 g/cm$^3$ or less.

5. A sealant film as defined in claim 4 wherein the fourth layer comprises an adherent polyethylene or ethylene-vinyl acetate copolymer, and the fifth layer comprises linear low-density polyethylene or low-density polyethylene.

6. A sealant film as defined in claim 4 wherein the fourth layer has a thickness of 5 to 25 μm, and the fifth layer has a thickness of 10 to 40 μm.

7. A sealant film as defined in claim 1 wherein the film is 50 to 80 μm in overall thickness.

8. A film for medical containers which comprises a base film and a sealant film defined in claim 1.

9. A film for packaging medical containers which comprises a base film and a sealant film defined in claim 1.

10. A film for covering medical containers which comprises a base film and a sealant film as defined in claim 1.

11. A product formed from a film as defined in claim 8.

12. A sealant film according to claim 1, wherein a co-extrusion inflation process is used to form the multilayer film comprising a first layer, a second layer and a third layer, and wherein the lay flat width of the film is set to be 420–1100 mm and the film take-off speed is set to be 7.0–15.0 m/min during formation of the film.

13. A sealant film as defined in claim 12 wherein the first layer comprises linear low density polyethylene or low-density polyethylene, and the second layer comprises an adherent polyethylene or ethylene-vinyl acetate copolymer.

14. A sealant film as defined in claim 12 wherein the first layer has a thickness of 10 to 40 μm, the second layer has a thickness of 5 to 24 μm, and the third layer has a thickness of 10 to 25 μm.

15. A sealant film as defined in claim 12 further including a fifth layer comprising at least one resin selected from the group consisting of linear low-density polyethylene, low-density polyethylene, polypropylene and polybutene-1 laminated to the outer side of the third layer, and a fourth layer between the third layer and the fifth layer serving as an adhesive layer and comprising a resin containing at least one of an amorphous polyolefin, adherent polyolefin and ethylene-vinyl acetate copolymer, wherein the difference in density between the fourth layer and the fifth layer is 0.02 g/cm$^3$ or less.

16. A sealant film as defined in claim 15 wherein the fourth layer comprises an adherent polyethylene or ethylene-vinyl acetate copolymer, and the fifth layer comprises linear low-density polyethylene or low-density polyethylene.

17. A sealant film as defined in claim 15 wherein the fourth layer has a thickness of 5 to 25 µm, and the fifth layer has a thickness of 10 to 40 µm.

18. A sealant film as defined in claim 12 wherein the film is 50 to 80 µm in overall thickness.

19. A film for medical containers which comprises a base film and a sealant film defined in claim 12.

20. A film for packaging medical containers which comprises a base film and a sealant film defined in claim 12.

21. A film for covering medical containers which comprises a base film and a sealant film as defined in claim 12.

22. A product formed from a film as defined in claim 19.

23. A method for producing a medical multilayer sealant film employing a co-extrusion inflation process, the medical multilayer sealant film comprising a first layer comprising at least one resin selected from the group consisting of linear low-density polyethylene, low-density polyethylene, polypropylene and polybutene-1, and a third layer comprising an ethylene-vinyl alcohol copolymer laminated to the outer side of the first layer with a second layer serving as an adhesive layer and comprising a resin containing at least one of an amorphous polyolefin, adherent polyolefin and ethylene-vinyl acetate copolymer, wherein the difference in density between the first layer and the second layer is 0.02 g/cm$^3$ or less, and wherein the lay flat width of the film is set to be 420 mm–1100 mm and the film take-off speed is set to be 7.0–15.0 m/min during formation of the film.

* * * * *